United States Patent [19]
Beardsley et al.

[11] Patent Number: 6,141,731
[45] Date of Patent: Oct. 31, 2000

[54] METHOD AND SYSTEM FOR MANAGING DATA IN CACHE USING MULTIPLE DATA STRUCTURES

[75] Inventors: Brent Cameron Beardsley; Michael Thomas Benhase; Douglas A. Martin; Robert Louis Morton; Mark A. Reid, all of Tuscon, Ariz.

[73] Assignee: International Business Machines Corporation, Armonk, N.Y.

[21] Appl. No.: 09/136,630

[22] Filed: Aug. 19, 1998

[51] Int. Cl.$^7$ ..................................................... G06F 12/00
[52] U.S. Cl. ........................ 711/136; 711/133; 711/135; 711/159; 711/160
[58] Field of Search .................................. 711/133, 135, 711/136, 159, 160

[56] References Cited

U.S. PATENT DOCUMENTS

| | | |
|---|---|---|
| 4,437,155 | 3/1984 | Sawyer et al. . |
| 4,458,316 | 7/1984 | Fry et al. . |
| 4,468,730 | 8/1984 | Dodd et al. . |
| 4,489,378 | 12/1984 | Dixon et al. . |
| 4,490,782 | 12/1984 | Dixon et al. . |
| 4,533,995 | 8/1985 | Christian et al. . |

(List continued on next page.)

FOREIGN PATENT DOCUMENTS

| | | |
|---|---|---|
| 0674263 | 2/1995 | European Pat. Off. . |
| 6052060 | 3/1994 | Japan . |

OTHER PUBLICATIONS

Stone et al., "Optional Partitioning of Cache Memory", 1992, pp. 1054–1068.
Improving Most Recently User Change Prefetching, IBM Techinical Disclosure Bulletin, vol. 36, No. 08, Aug. 1993.
Optimized Look–Ahead Extension on Sequential Access, IBM Technical Disclosure Bulletin, vol. 39, No. 11, Nov. 1996.
Direct Access Storage Device Cache Segment Management, IBM Technical Disclosure Bulletin, vol. 37, No. 08, Aug. 1994.
Cache System for Hard Disk System Utilizing the Access Data Address, IBM Technical Disclosure Bulletin, vol. 38, No. 01, Jan. 1995.
Direct Memory Access Paging and Remote DRAM Access Through an Optimized Memory Mapping Mechanism, IBM Technical Disclosure Bulletin, vol. 38, No. 06, Jun. 1995.
Non–Volatile Cache Storage Allocation Algorithm, IBM Technical Disclosure Bulletin, vol. 38, No. 12, Dec. 1995.
Fixed Storage Allocation of Input–Output Buffers, IBM Technical Disclosure Bulletin, vol. 39, No. 03, Mar. 1996.
Remote Copy Administrator's Guide and Reference, DFSMS/MVS Version 1, Third Edition, Jul. 1996, IBM Doc. No. SC35–0169–02.

(List continued on next page.)

*Primary Examiner*—John W. Cabeca
*Assistant Examiner*—Brian R. Peugh
*Attorney, Agent, or Firm*—David W. Victor; Konrad Raynes & Victor LLP

[57] ABSTRACT

Disclosed is a cache management scheme using multiple data structure. A first and second data structures, such as linked lists, indicate data entries in a cache. Each data structure has a most recently used (MRU) entry, a least recently used (LRU) entry, and a time value associated with each data entry indicating a time the data entry was indicated as added to the MRU entry of the data structure. A processing unit receives a new data entry. In response, the processing unit processes the first and second data structures to determine a LRU data entry in each data structure and selects from the determined LRU data entries the LRU data entry that is the least recently used. The processing unit then demotes the selected LRU data entry from the cache and data structure including the selected data entry. The processing unit adds the new data entry to the cache and indicates the new data entry as located at the MRU entry of one of the first and second data structures.

40 Claims, 7 Drawing Sheets

U.S. PATENT DOCUMENTS

| | | |
|---|---|---|
| 4,583,166 | 4/1986 | Hartung et al. . |
| 4,603,382 | 7/1986 | Cole et al. . |
| 4,636,946 | 1/1987 | Hartung et al. . |
| 4,875,155 | 10/1989 | Iskiyan et al. . |
| 4,882,642 | 11/1989 | Tayler et al. . |
| 4,956,803 | 9/1990 | Tayler et al. . |
| 4,979,108 | 12/1990 | Crabbe, Jr. . |
| 5,134,563 | 7/1992 | Tayler et al. . |
| 5,263,145 | 11/1993 | Brady et al. . |
| 5,297,265 | 3/1994 | Frank et al. . |
| 5,394,531 | 2/1995 | Smith ........... 711/136 |
| 5,426,761 | 6/1995 | Cord et al. . |
| 5,432,919 | 7/1995 | Falcone et al. . |
| 5,432,932 | 7/1995 | Chen et al. . |
| 5,434,992 | 7/1995 | Mattson . |
| 5,440,686 | 8/1995 | Dahman et al. . |
| 5,440,727 | 8/1995 | Bhide et al. . |
| 5,446,871 | 8/1995 | Shomler et al. . |
| 5,481,691 | 1/1996 | Day, III et al. . |
| 5,504,861 | 4/1996 | Crockett et al. . |
| 5,542,066 | 7/1996 | Mattson et al. ........... 711/136 |
| 5,551,003 | 8/1996 | Mattson et al. . |
| 5,574,950 | 11/1996 | Hathorn et al. . |
| 5,590,308 | 12/1996 | Shih . |
| 5,592,618 | 1/1997 | Micka et al. . |
| 5,606,688 | 2/1997 | McNutt et al. . |
| 5,615,329 | 3/1997 | Kern et al. . |
| 5,623,599 | 4/1997 | Shomler . |
| 5,623,608 | 4/1997 | Ng . |
| 5,627,990 | 5/1997 | Cord et al. . |
| 5,636,359 | 6/1997 | Beardsley et al. . |
| 5,651,136 | 7/1997 | Denton et al. . |
| 5,692,152 | 11/1997 | Cohen et al. ........... 711/140 |
| 5,805,855 | 9/1998 | Liu ........... 711/108 |
| 6,041,390 | 3/2000 | Liu et al. ........... 711/110 |

OTHER PUBLICATIONS

Pinter and Yoaz; Tango: a Hardware–based Data Prefetching Technique for Superscalar Processors; Proceedings of the 29th Annual IEEE/ACM International Symposium on Microarchitecture MICRO–29, Dec. 2–4, 1996, Paris France.

Patterson, et al.; Informed Prefetching and Caching; Proceedings of the $15^{th}$ ACM Symposium on Operating Systems Principles, Dec. 3–6, 1995, Copper Mountain Resort, Colorado.

Tomkins et al; Informed Multi Process Prefetching and Caching; Performance Evaluation Review Special Issue, vol. 25, No. 1, Jun. 1997—1997 ACM Sigmetrics Interantional Conference on Measurement and Modeling of Computer Systems.

Patterson and Gibson; Exposing I/O Concurrency with Informed Prefetching; Proceedings of the Third International Conference on Parallel and Distributed Information Systems, Sep.28–30, 1994, Austin, Texas.

Shih, et al.; A File–Based Adaptive Prefetch Caching Design; Proceedings, 1990 IEEE International Conference on Computer Design; VLSI in Computers and Processors, Sep. 17–19, 1990, Hyatt Regency Cambridge, Cambridge, MA.

King, et al.; Management of a Remote Backup Copy for Disaster Recovery; ACM Transactions on Database Systems, vol. 16, No. 2, Jun. 1991, pp. 338–368.

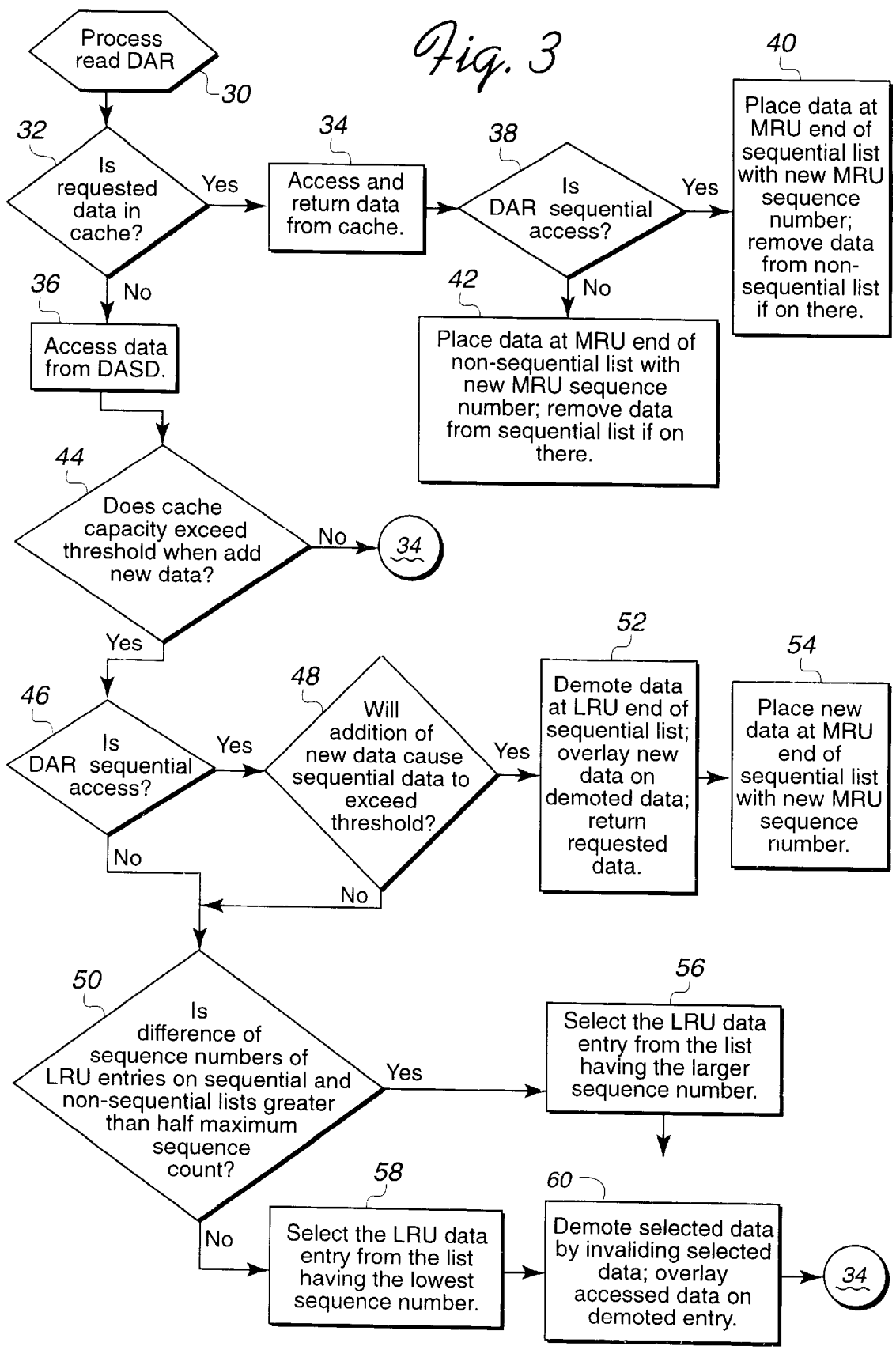

METHOD AND SYSTEM FOR MANAGING DATA IN CACHE USING MULTIPLE DATA STRUCTURES

BACKGROUND OF THE INVENTION

1. Field of the Invention

The present invention relates to a method and system for caching data and, in particular, for using multiple data structures to manage data stored in cache.

2. Description of the Related Art

Data processing systems use a high-speed managed buffer memory, otherwise known as cache, to store frequently used data that is regularly maintained in a relatively slower memory device. For instance, a cache can be a RAM that buffers frequently used data regularly stored in a hard disk drive or a direct access storage device (DASD). After a track is read from the DASD, the track will be cached in RAM and available for subsequent data access requests (DARs). In this way, a storage controller processing read requests can avoid the mechanical delays of having to physically access and read data from the DASD. Cache can also be a high speed memory to a microprocessor to store data and instructions used by the microprocessor that are regularly maintained in RAM. Processor cache would buffer data from a volatile memory device, such as a DRAM or RAM.

Often data in cache is managed according to a least recently used (LRU) replacement algorithm in which the least recently used data is demoted from the cache to make room for new data. A first-in-first-out (FIFO) algorithm may also be used. The LRU replacement algorithm works by organizing the data in the cache in a linked list of data entries which is sorted according to the length of time since the most recent reference to each data entry. The most recently used (MRU) data is at one end of the linked list, while the least recently used (LRU) data is at the other. Data that is accessed from the linked list or added for the first time is promoted to the MRU end. When data is demoted to accommodate the addition of new data, the demoted data is removed from the LRU end.

Data can be accessed sequentially or non-sequentially. In the non-sequential access mode, data records are randomly requested. Such non-sequential accesses often occur when an application needs a particular record or data sets. Sequential data access occurs when numerous adjacent tracks are accessed, such as for a data backup operation or to generate a large report. For instance, a disk backup usually creates one long sequential reference to the entire disk, thus flooding the cache with data. One problem with LRU schemes is that if a sequential data access floods the cache when placed at the MRU end, then other non-sequential records are demoted and removed from cache to accommodate the large sequential data access. Once the non-sequential data is demoted from cache, a data access request (DAR) for the demoted data must be handled by physically accessing the data from the slower memory device.

One goal of cache management algorithms is to maintain reasonable "hit ratios" for a given cache size. A "hit" is a DAR that was returned from cache, whereas a "miss" occurs when the requested data is not in cache and must be retrieved from DASD. A "hit ratio" is empirically determined from the number of hits divided by the total number of DARs, both hits and misses. System performance is often determined by the hit ratio. A system with a low hit ratio may cause delays to application program processing while requested data is retrieved from DASD.

A low hit ratio indicates that the data often was not in cache and had to be retrieved from DASD. Low hit ratios may occur if non-sequentially accessed data is "pushed" out of the cache to make room for a long series of sequentially accessed data. The higher probability of subsequent DARs toward non-sequentially accessed data further lowers the hit ratio because non-sequentially accessed data has a greater likelihood of being accessed. Moreover, the non-sequentially accessed data is "pushed out" of cache to make room for sequentially accessed data that has a lower likelihood of being accessed.

In certain systems, sequential data is placed at the LRU end and non-sequential data at the MRU end. Such methodologies often have the effect of providing an unreasonably low hit ratio for sequentially accessed data because the sequentially accessed data has some probability of being accessed (although usually less than non-sequentially accessed data). Algorithms that place sequentially accessed data at the LRU end cause the sequential data to be demoted very quickly, thus providing a relatively low hit ratio. Still further, if there is a continued sequence of write operations, i.e., modified data, read data could be pushed off the LRU list in cache, thus lowering the hit ratio for read accessed data.

In current storage controller systems, a battery backed up RAM or non-volatile storage unit (NVS) may maintain a shadow copy of all modified data in cache. Storage systems provided by International Business Machines Corporation ("IBM") include two write operations, a cache fast write (CFW) and a DASD fast write (DFW). In a DASD fast write operation, data is written to both the cache and the NVS unit. The DASD fast write operation allows fast write hits by maintaining two copies of all data modifications, one in cache and another in NVS storage. The non-volatile storage protects against data loss by saving the data for up to 48 hours (assuming a fully-charged battery) if power fails. When power is restored, then the data may be destaged from the NVS unit to DASD. DASD fast write applies to all write hits and to predictable writes. A write hit occurs when the requested data is in the cache.

Cache fast write (CFW) improves write operation performance for data that the user does not need to store on DASD. Because the data does not have to be stored on the DASD, cache fast write eliminates DASD access time for write hits and predictable write operations as the write data need only be stored in cache. Further, cache fast write does not use non-volatile storage. However, cache fast write data may be written to DASD during the execution of cache management algorithms. Aspects of the DASD fast write and cache fast write operations are described in IBM publication entitled "Storage Subsystem Library: IBM 3990 Storage Control Reference (Models 1, 2, and 3)", IBM document no. GA32-0099-06, (IBM Copyright 1988, 1994), which publication is incorporated herein by reference in its entirety.

When the NVS unit reaches a predetermined threshold, data in the NVS unit must be destaged from the NVS. In current systems, the entire LRU linked list including all data entries must be scanned to locate the least recently used DASD fast write data to select as a candidate for destaging from the NVS unit.

Moreover, with current systems, frequently updated data will not be destaged to disk because when the data is updated, a new time stamp is provided which places the modified data at the top of the LRU list. Thus, frequently modified data may be more susceptible to loss as a result of system failures because such data tends not to be destaged and is instead systematically placed at the MRU end of the linked list.

SUMMARY OF THE PREFERRED EMBODIMENTS

To overcome the limitations in the prior art described above, preferred embodiments disclose a cache management scheme. A first and second data structures indicate data entries in a cache. Each data structure has a most recently used (MRU) entry, a least recently used (LRU) entry, and a time value associated with each data entry indicating a time the data entry was indicated as added to the MRU entry of the data structure. A processing unit receives a new data entry. In response, the processing unit processes the first and second data structures to determine a LRU data entry in each data structure and selects from the determined LRU data entries the LRU data entry that is the least recently used. The processing unit then demotes the selected LRU data entry from the cache and data structure including the selected data entry. The processing unit adds the new data entry to the cache and indicates the new data entry as located at the MRU entry of one of the first and second data structures.

In preferred embodiments, the data structures are linked lists, wherein the MRU entry is at one end of the linked list, and the LRU entry is at the other end.

In farther embodiments, the first data structure is a list of data in cache sequentially accessed and the second data structure is a list of data in cache non-sequentially accessed. In yet further embodiments, the first data structure is a list of data written as part of a first type of write operation and the second data structure is a list of data written as part of a second type of write operation. Data written to the cache as part of the first type of write operation is also written to a storage unit.

In still additional embodiments, a third data structure of data entries from the first and second data structures has data entries having a modified time value that indicates when the data entry was first modified in cache. The processing unit provides a base time value indicating a previous time value. For those data entries in the third data structure having a time value that is older than the base time value, the processing unit destages the copy of the modified data maintained in cache to the storage unit.

Preferred embodiments provide a method and system for managing data in cache in different LRU linked lists. Using separate lists, the cache can be more efficiently managed to properly select data entries for demoting. When the linked lists distinguish between non-sequentially and sequentially accessed data, sequentially accessed data may be readily accessed from the sequentially accessed linked list for demotion to prevent sequentially accessed data from dominating cache. Moreover, if separate lists are used to distinguish between a cache fast write (CFW) and DASD fast write (DFW) where data is backed up in non-volatile storage, then when data is to be destaged from the non-volatile storage, a value to destage can be readily located from the DFW list.

BRIEF DESCRIPTION OF THE DRAWINGS

Referring now to the drawings in which like reference numbers represent corresponding parts throughout:

FIG. 3 illustrates logic to process a data access request (DAR) and demote data from cache in accordance with preferred embodiments of the present invention;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 1:
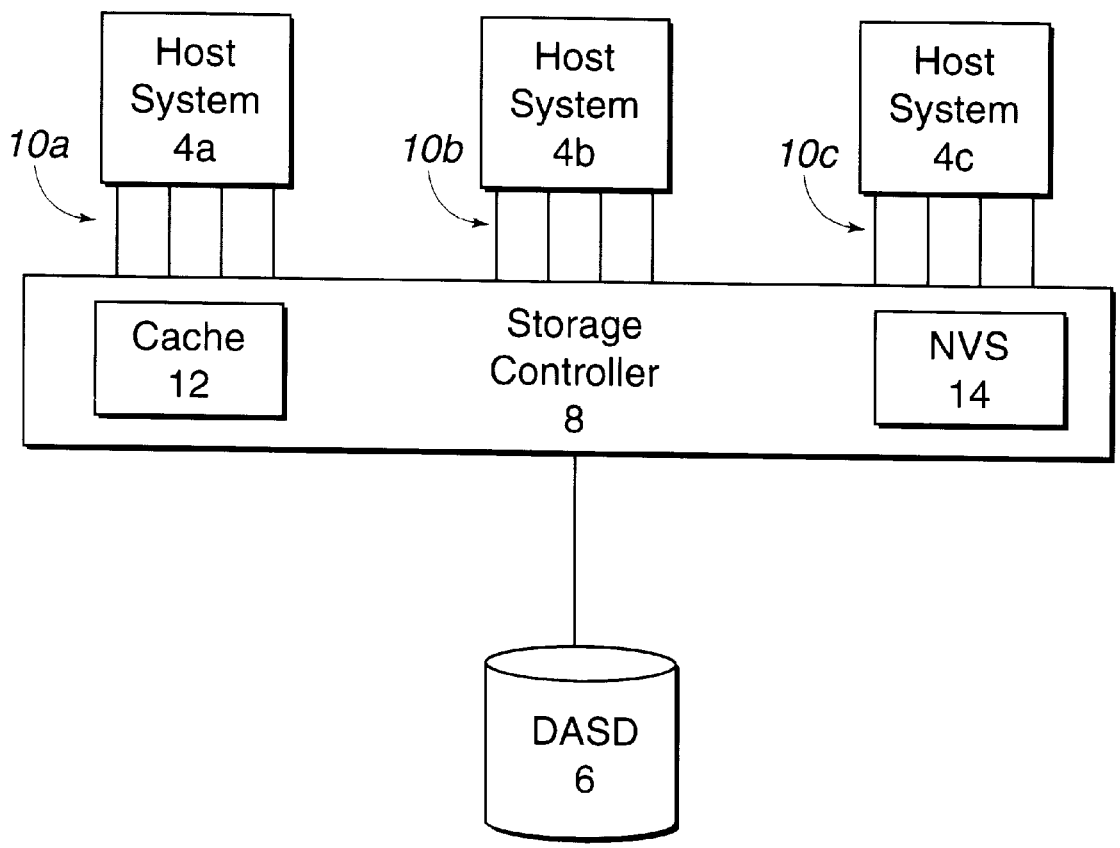
FIG. 1 is a block diagram illustrating a software and hardware environment in which preferred embodiments of the present invention are implemented.

FIG. 1 illustrates a hardware environment in which preferred embodiments are implemented. A plurality of host systems 4a, b, c are in data communication with a DASD 6 via a storage controller 8. The host systems 4a, b, c may be any host system known in the art, such as a mainframe computer, workstations, etc., including an operating system such as WINDOWS®, AIX®, UNIX®, MVS™, etc. AIX is a registered trademark of IBM; MVS is a trademark of IBM; WINDOWS is a registered trademark of Microsoft Corporation; and UNIX is a registered trademark licensed by the X/Open Company LTD. A plurality of channel paths 10a, b, c in the most systems 4a, b, c provide communication paths to the storage controller 8. The storage controller 8 and host systems 4a, b, c may communicate via any network or communication system known in the art, such as LAN, TCP/IP, ESCON®, SAN, SNA, Fibre Channel, SCSI, etc. ESCON is a registered trademark of International Business Machines Corporation ("IBM"). The host system 4a, b, c executes commands and receives returned data along a selected channel 10a, b, c. The storage controller 8 issues commands to physically position the electromechanical devices to read the DASD 6. In preferred embodiments, the structure of the storage controller 8 and interface between the storage controller 8 and host system may include aspects of the storage controller architecture described in the following U.S. patent applications assigned to IBM: "Failover System for a Multiprocessor Storage Controller," by Brent C. Beardsley, Matthew J. Kalos, Ronald R. Knowlden, Ser. No. 09/026,622, filed on Feb. 20, 1998; and "Failover and Failback System for a Direct Access Storage Device," by Brent C. Beardsley and Michael T. Benhase, Ser. No. 08/988,887, filed on Dec. 11, 1997, both of which applications are incorporated herein by reference in their entirety.

The storage controller 8 further includes a cache 12. In alternative embodiments, the cache 12 may be implemented in alternative storage areas accessible to the storage controller 8. In preferred embodiments, the cache 12 is implemented in a high speed, volatile storage area within the storage controller 8, such as a DRAM, RAM, etc. The length of time since the last use of a record in cache is maintained to determine the frequency of use of cache. Data can be transferred between the channels 10a, b, c and the cache 12, between the channels 10a, b, c and the DASD 6, and between the DASD 6 and the cache 12. In alternative embodiments with branching, data retrieved from the DASD 6 in response to a read miss can be concurrently transferred to both the channel 10a, b, c and the cache 12 and a data write can be concurrently transferred from the channel 10a, b, c to both a non-volatile storage unit and cache 12.

Also included in the storage controller 8 is a non-volatile storage (NVS) unit 14, which in preferred embodiments is a battery backed-up RAM, that stores a copy of modified data maintained in the cache 12. In this way if failure occurs and the modified data in cache 12 is lost, then the modified data may be recovered from the NVS unit 14.

To determine whether a DAR is sequentially or non-sequentially accessed, a command may be used to inform the storage controller 8 that a following DAR request is part of a series of sequentially accessed data. For instance, in the IBM mainframe environment, a Define Extent command indicates whether the following I/O operations are part of a sequential access. A description of the Define Extent commands is provided in the IBM publication, "IBM 3990/9390 Storage Control Reference," IBM Document no. GA32-0274-04 (Copyright IBM, 1994, 1996), which publication is incorporated herein by reference in its entirety. Alternatively, the storage controller 8 may utilize a predictive buffer memory management scheme to detect whether a sequence of data transfer operations are part of a sequential data access request. Such predictive buffer memory management schemes are described in U.S. Pat. No. 5,623,608, entitled "Method and Apparatus for Adaptive Circular Predictive Buffer Management," assigned to IBM, and which patent is incorporated herein by reference in its entirety. These predictive memory buffer schemes may be used to detect sequential access for SCSI or mainframe type requests when the DARs do not specifically indicate whether the DAR is part of an ongoing sequential access.

Multiple Linked Lists in Cache

Figure 2A:
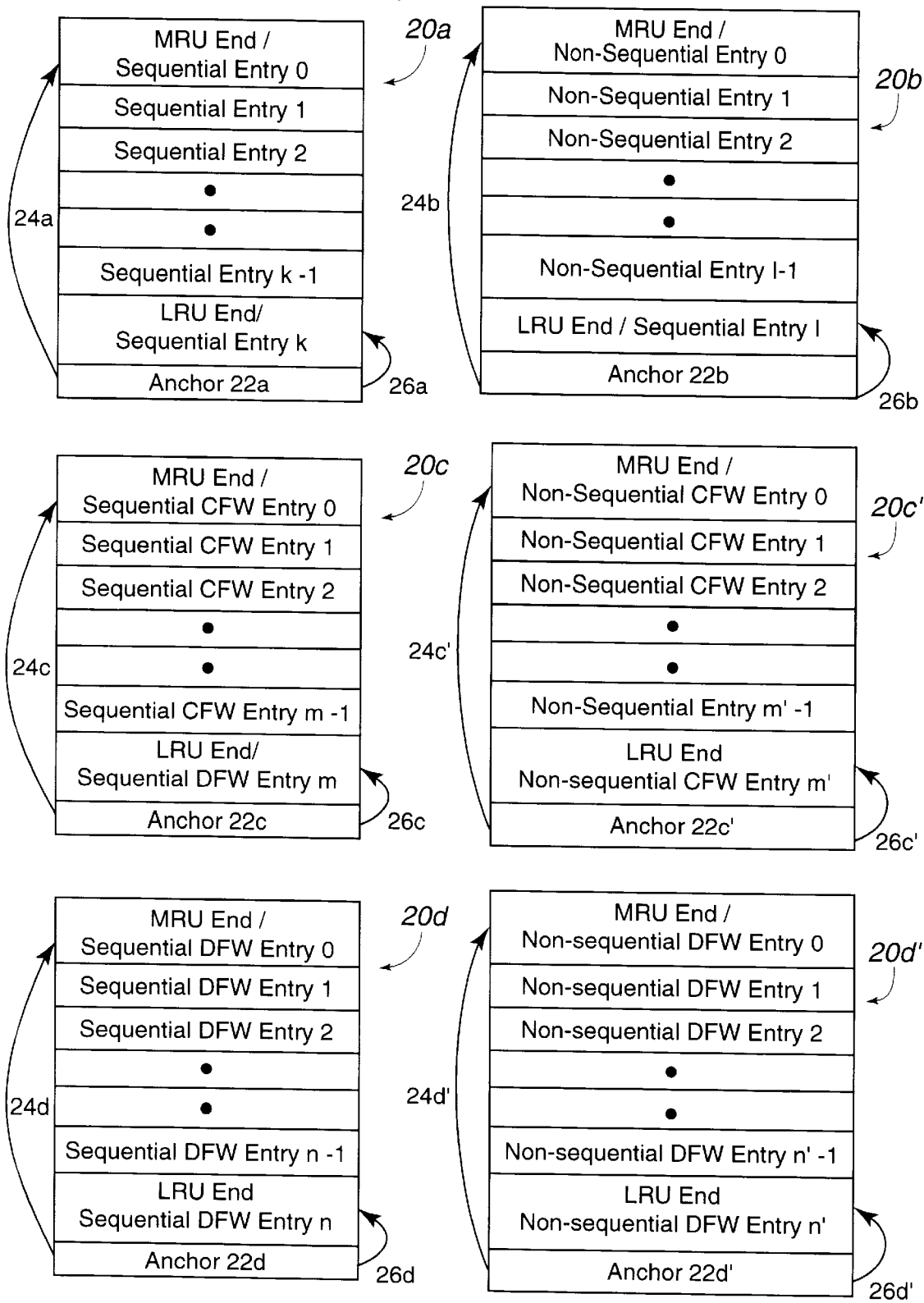
FIGS. 2a, b illustrate linked lists of cache entries in accordance with preferred embodiments of the present invention.

FIGS. 2a, b illustrate preferred embodiments of doubly linked list data structures 20a, b, c, c', d, d', e maintained in cache 12. Each linked list 20a, b, c, c', d, d', e is comprised of a node including a list of pointers to data or track entries in the cache 12. Thus, a data entry in cache may be on multiple lists. In preferred embodiments, list 20a comprises pointers to all k sequentially accessed data entries in cache 12; list 20b comprises pointers to all l non-sequentially accessed entries in cache 12; list 20c comprises all m sequentially accessed cache fast write (CFW) entries in cache 12; list 20c' comprises all m' non-sequentially accessed cache fast write (CFW) entries in cache 12; list 20d comprises all n sequentially accessed DASD fast write (DFW) entries in cache 12; list 20d' comprises all non-sequentially accessed n' DASD fast write (DFW) entries in cache 12; and list 20e in FIG. 2b comprises a set of modified entries in cache 12 and a sequence number indicating when the entry was first modified in cache 12. Thus, lists 20a and 20b combined include all entries in cache and lists 20c, c' and 20d, d' combined include all modified data entries in cache.

Each list includes an anchor entry 22a, b, c, c', d, d', e which includes a pointer to the top of the list or most recently used (MRU) end 24a, b, c, c', d, d', e and a pointer to the bottom of the list or the least recently used (LRU) end 26a, b, c, c', d, d', e. As the list is doubly linked, each entry in the lists includes a pointer to the entry above, i.e., closer to the MRU end 24a, b, c, c', d, d', e referred to herein as an "up pointer" and a pointer to the entry below, i.e., closer to the LRU end 26a, b, c, c', d, d', e referred to herein as a "down pointer."

Associated with each entry in the list is an MRU sequence counter indicating a time stamp when the data was added to the linked list 20a, b, c, c', d, d', e. In preferred embodiments, when a data entry is added to the linked lists 20a, b, c, c', d, d', e, the previous MRU sequence counter is incremented to determine the current MRU sequence number. In this way, entries with a lower sequence counter number have remained in the list unaccessed for a longer period of time, i.e., less recently used. In preferred embodiments, after the storage controller 8 accesses data, the data is added back to the MRU end 24a, b, c, c', d, d'. However, list 20e does not alter the sequence number of data entries after the data is placed in cache 12 as list 20e maintains the sequence number for when the entry was first modified in cache 12 and does not change as a result of subsequent modifications or accesses to the data entries. As entries are added at the MRU end 24a, b, c, c', d, d', e other entries move down the doubly linked list toward the LRU end 26a, b, c, c', d, d', e.

The lists 20a, b, c, c', d, d', e may be implemented as a doubly linked list of pointers to the data in cache 12 as shown in FIG. 2. Alternatively, the lists 20a, b, c, c', d, d', e may be implemented in control blocks allocated in cache 12, wherein each track or data set has a corresponding control block in the control block section of cache 12. If a track or data set was in the list 20a, b, c, c', d, d', e, then the control block for such track would include fields indicating for the data entry in cache 12 the "up pointer", "down pointer," MRU sequence number for each list 20a, b, c, c', d, d', e including the data entry. Another control block could maintain the anchor 22a, b, c, c', d, d', e information to access the beginning and end of the list. Embodiments utilizing the control blocks may be used to avoid dynamic memory allocation. In still further embodiments, the list 20a, b, c, c', d, d', e may be comprised of the actual data instead of just pointers to such data.

By providing separate lists, the storage controller 8 may more effectively manage cache 12 and determine which entries to demote or destage from the NVS unit 14. For instance, to prevent sequentially accessed data from dominating cache 12, the storage controller 8 can use the sequentially accessed list 20a to select data to demote from cache 12. Moreover, the storage controller 8 may modify the sequence number of sequentially accessed data to provide sequentially accessed data with a relatively lower sequence number than the sequence number provided non-sequentially accessed data. In this way, the storage controller 8 would be more likely to demote sequentially accessed data over non-sequentially accessed data. For instance, the storage controller 8 may accelerate or modify sequence numbers added to the sequential CFW 20c and DFW 20d lists to provide sequential modified data with a relatively lower sequence number so the sequential modified data is demoted before non-sequential modified data.

The storage controller 8 could also use the CFW 20c, c' and DFW 20d, d' lists comprising modified data to prevent modified data entries from dominating cache by selecting modified entries from the CFW 20c, c' and DFW 20d, d' lists to demote after modified data, i.e., the total of entries in the CFW 20c, c' and DFW 20d, d' lists, reaches a predetermined threshold level of cache 12.

Data in cache 12 may be on more than one list. For instance, a data track can be on one of the sequential list 20a or non-sequential list 20b, but not both, and on one of the CFW list 20c, c' or DFW list 20d, d', but not more than one of the lists, and on the modified list 20e indicating when the data was first modified in cache 12. Moreover, the sequence number for a data entry maintained on two lists may be different. For instance, a data entry on the DFW lists 20d, d' has a sequence number indicating when the entry was last DASD fast write modified. If this entry is subsequently accessed sequentially as part of a read request, then this entry would have a more current sequence number on the sequential list 20*a* than the DFW lists 20*d, d'*, which remains unchanged as a result of the access. The sequential 20*a* and non-sequential 20*b* lists are updated on either a read or write data access request. Moreover, the same data entry may have an even earlier sequence number on the list 20*e* indicating when the data entry was first modified in cache 12.

Figure 2B:
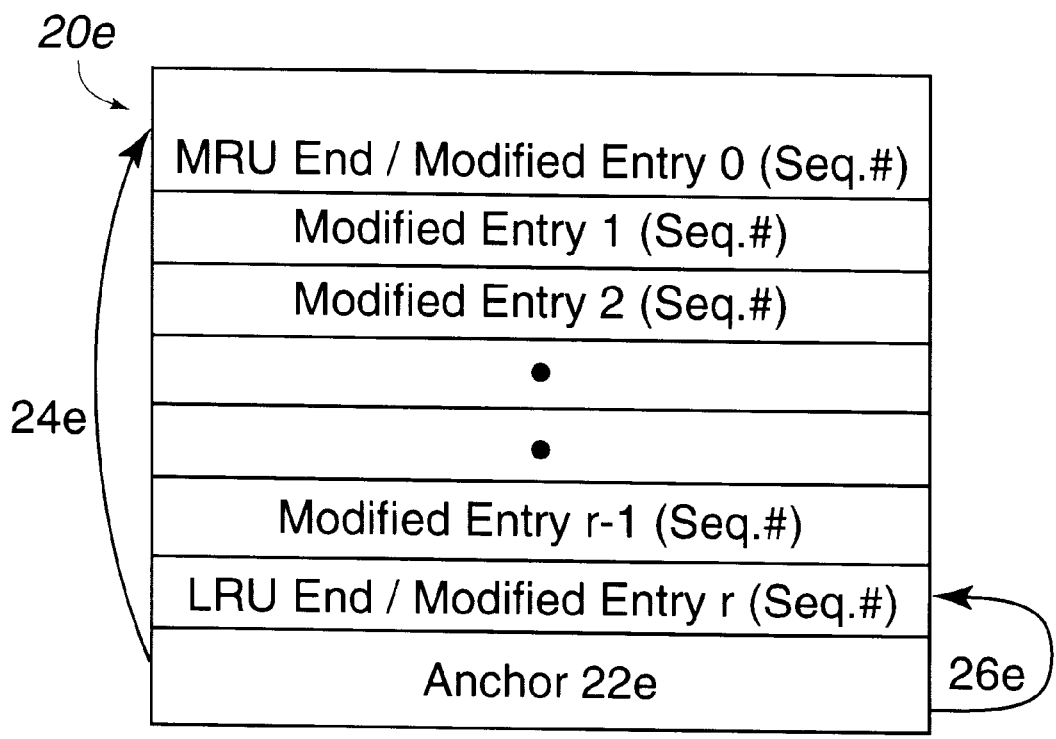

FIG. 2*b* illustrates a preferred embodiment of the time sequence destage list 20*e* which is used to determine when to destage entries from cache 12 that were modified. At predetermined time intervals, the storage controller 8 would access the list 20*e* and destage all entries having a sequence number less than a certain previous time value. In this way, the storage controller 8 can insure that data will not remain unmodified and not destaged to DASD 6 for an extended period of time. Once a data entry is destaged using the time sequence list 20*e*, the DFW list 20*d, d'* or CFW list 20*c, c'*, the data entry is removed from the time sequence list 20*e*.

To add a data entry to the MRU end of a list 20*a, b, c, c', d, d', e*, the storage controller 8 would modify the MRU pointer to point to the added data entry, adjust the up pointer of the previous MRU entry to address the new (added data entry) MRU data entry and adjust the down pointer of the new MRU entry to address the previous MRU data entry. A sequence number is maintained to indicate when a data entry was placed at the MRU end 24*a, b, c, c', d, d', e* of the list 20*a, b, c, c', d, d', e*. When placing a data entry at the MRU end 24*a, b, c, c', d, d', e* the storage controller 8 would increment the sequence number. To place a data entry at the MRU end 24*a, b, c, c', d, d'* that is already in the list, the storage controller 8 would have to first remove the data entry from the list before placing the data entry at the MRU end. To remove a data entry from a list, the up and down pointers of the removed data entry are set to null and the up and down pointers of the entries in the list 20*a, b, c, c', d, d', e* that addressed the removed data entry are modified to address each other. If a data entry was removed from the LRU 26*a, b, c, c', d, d', e* or the MRU 24*a, b, c, c', d, d', e* end, then the MRU 24*a, b, c, c', d, d', e* and LRU pointers 26*a, b, c, c', d, d', e* would have to be modified.

To demote a data entry from the LRU end 26*a, b, c, c', d, d', e* of the list 20*a, b, c, c', d, d', e*, the storage controller 8 would modify the LRU pointer 26*a, b, c, c', d, d', e* in the anchor entry 22*a, b, c, c', d, d', e* to address the data entry addressed by the up pointer of the entry to be demoted, set the down pointer of the data entry addressed by the new LRU data entry to null, and modify the up pointer of the data entry to demote to null.

Cache Management

FIG. 3 illustrates logic executed by the storage controller 8 to process a read request. Because a read request does not concern modified data, only the sequential 20*a* and non-sequential 20*b* lists are used. Control begins at block 30 which represents the storage controller 8 processing a read DAR. Control transfers to block 32 which represents the storage controller 8 determining whether the requested data is in cache 12. If so, control transfers to block 34; otherwise control transfers to block 36. At block 34, the storage controller 8 accesses the requested data from cache 12 and returns the accessed data to the requestor, i.e., application or device initiating the read DAR. Control then transfers to block 38 which represents the storage controller 8 determining whether the accessed read DAR is a sequential access request. If so, control transfers to block 40 which represents the storage controller 8 placing the accessed data at the MRU end 24*a* of the sequential list 20*a* and provide the data entry the current MRU sequence number. The current MRU sequence number may be calculated by incrementing the previous sequence number. If the data entry was on the non-sequential list 20*b*, then the storage controller 8 would remove the data from the non-sequential list. Otherwise, if the DAR read request is non-sequential, then control transfers to block 42 which represents the storage controller placing the accessed data at the MRU end 24*b* of the non-sequential list 20*b* and, if necessary, removing the data entry from the sequential list 20*a*.

If the requested data is not in the cache 12, then control transfers to block 36 which represents the storage controller 8 accessing the requested data from DASD 6. Control then transfers to block 44 which represents the storage controller 8 determining whether the addition of the accessed data will exceed a cache 12 capacity threshold. If no, control transfers to block 34 et seq. to return the requested data to the requestor and add the accessed data to the MRU end 24*a, b* of the appropriate list 20*a, b*. If the cache 12 capacity threshold would be exceeded, then the storage controller 8 must demote a data entry from the LRU end 26*a, b* of one of the sequential or non-sequential linked lists 20*a, b* in cache 12.

Control transfers to block 46 which represents the storage controller determining whether the requested data is from a sequential DAR. If so, control transfers to block 48; otherwise, control transfers to block 50. Block 48 represents the storage controller 8 determining whether the addition of new data will cause the amount of sequentially accessed data in cache 12 to exceed some predetermined threshold. The storage controller 8 may make such determination by considering the total number of sequentially accessed data entries in the sequential list 20*a*. If the addition of the new sequentially accessed data entry will cause the limit to be exceeded, then control transfers to block 52; otherwise, control transfers to block 50. Block 52 represents the storage controller 8 demoting data at the LRU end 26*a* of the sequential list 20*a*, overlaying the new data onto the location of the demoted data, and returning the requested data. Control then transfers to block 54 where the storage controller 8 places the accessed data at the MRU end 24*a* of the sequential list 20*a* with the new MRU sequence number.

If sequential data does not have to be demoted, then the storage controller 8 must determine the sequentially or non-sequentially accessed data entry that has been in cache 12 the longest without being accessed, i.e., the LRU entry 26*a, b*, across both lists 20*a, b*. At block 50, the storage controller 8 determines whether either of the lowest sequence numbers in the lists 20*a, b* have wrapped. For instance, if the maximum sequence counter is 100, then any sequence number less than 100 is either that number under 100 or greater than 100 if the counter "wrapped." For instance a sequence number of 4 can be either 4, 104, 204, etc. To determine whether a wrap occurred, in preferred embodiments, the storage controller 8 may determine whether the difference of the LRU 26*a, b*, i.e., lowest sequence numbers from both lists 20*a, b*, is greater than half the maximum sequence count. For instance, if the maximum sequence count is 100 and the LRU (e.g., lowest sequence numbers) on the lists 20*a, b* are 3 and 94, then the difference, 91, is greater than half the maximum sequence count, 50. In such case, the storage controller 8 selects the greatest sequence number, 94, as it indicates an older sequence number than the wrapped sequence number 3.

If one of the sequence numbers wrapped, then control transfers to block 56, which represents the storage controller 8 selecting the LRU data entry 26a, b from the lists 20a, b having the larger sequence number as the candidate for demotion instead of the LRU data entry 26a, b having the lowest sequence number. Otherwise, control transfers to block 58 which represents the storage controller 8 selecting the LRU data entry 26a, b from the list 20a, b having the lowest sequence number, in which case there was not a wrap. From block 56 or 58, control transfers to block 60 which represents the storage controller 8 demoting the selected data entry by invalidating the selected data entry in cache 12 and overlaying the invalidated data entry with the new data entry. Control then transfers to block 34 to return the accessed data and place the accessed data at the MRU end 24a, b of the appropriate list 20a, b.

Figure 4A:
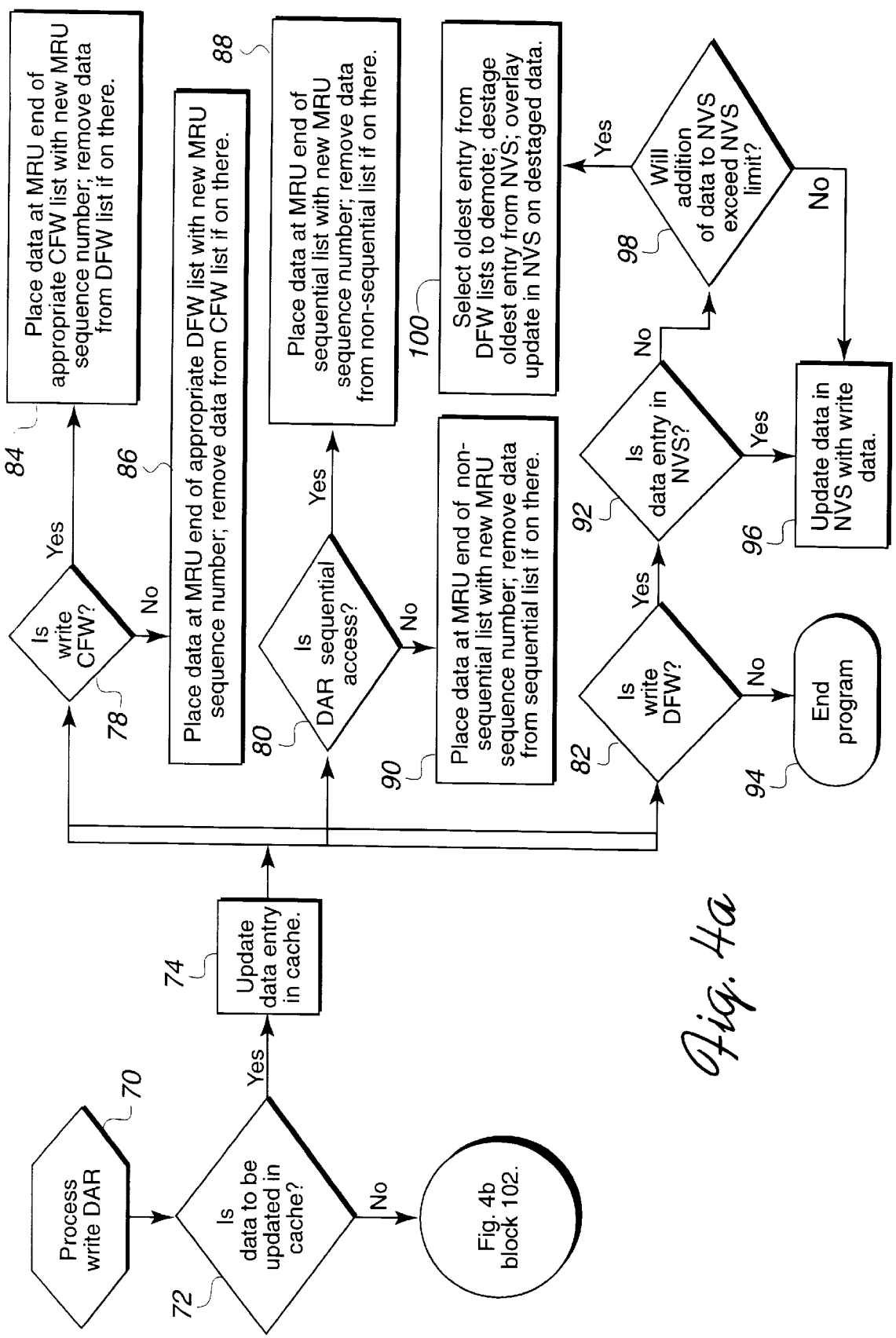
FIGS. 4a, b illustrate logic to process a write request and destage data from a non-volatile storage (NVS) unit in accordance with preferred embodiments of the present invention.

FIGS. 4a, b illustrate logic executed by the storage controller 8 to process a write operation to update data in the DASD 6. Control begins at block 70 which represents the storage controller 8 processing a write operation including modified data to update in the DASD 6. Control transfers to block 72 which is a decision block representing the storage controller 8 determining whether the data entry to update is already in cache 12. If so, control transfers to block 74; otherwise, control transfers to block 102 in FIG. 4b. If the data entry to update is in cache 12, then at block 74 the storage controller 8 updates the data entry in cache 12 and proceeds in parallel to execute blocks 78, 80, and 82 to place the updated data entries on the appropriate lists 20a, b, c, c'd, d'. At block 78, the storage controller 8 determines whether the write is a cache fast write (CFW). If the write is a CFW, then control transfers to block 84 which represents the storage controller 8 placing the updated data entry at the MRU end 24c, c' of the appropriate CFW list 20c, c' with the new MRU sequence number. Sequentially and non-sequentially written CFW data is placed on lists 20c, c', respectively. If the data entry was previously on one of the DASD fast write (DFW) lists 20d, d', then the storage controller 8 would remove the updated data entry from the DFW list 20d, d'. If the write is a DFW, then control transfers to block 86 which represents the storage controller 8 placing the updated data entry at the MRU end 24d, d' of the appropriate DFW list 20d, d' with the new sequence number. Sequentially and non-sequentially written DFW data is placed on lists 20d, d', respectively. If the data entry was previously on one of the CFW lists 20c, c', then the storage controller 8 would remove the updated data entry from the CFW list 20c, c'.

At block 80, the storage controller 8 determines whether the DAR write was a part of a series of sequential write operations. If so, control transfers to block 88 which represents the storage controller 8 placing the updated data entry at the MRU end 24a of the sequential list 20a with the new sequence number. If the data entry was previously on the non-sequential list 20b, then the storage controller 8 would remove the updated data entry from the non-sequential list 20b. If the write operation was a non-sequential operation, then control transfers to block 90 which represents the storage controller 8 placing the updated data entry at the MRU end 24b of the non-sequential list 20b with the new sequence number. If the data entry was previously on the sequential list 20a, then the storage controller 8 would remove the updated data entry from the sequential list 20a.

At block 82, the storage controller determines whether the write is a DASD fast write (DFW) operation. If so, control transfers to block 92; otherwise, control transfers to block 94 to end the program as the operation is a CFW and data does not have be placed in the NVS unit 14. If the write is a DFW, then at block 92 the storage controller determines whether the data entry to update is already in NVS 14. If so, control transfers to block 96 which represents the storage controller 8 updating the data entry in NVS 14 with the write update. Otherwise, if the data entry is not already in NVS 14, then control transfers to block 98 which represents the storage controller 8 determining whether the addition of data to the NVS 14 will exceed a predetermined threshold. If so, control transfers to block 100 to demote data at the LRU end 26d, d' of the DFW lists 20d, d' and destage the demoted data from the NVS 14 to DASD 16. In preferred embodiments, the storage controller 8 may select the NVS 14 entry to demote that is the oldest entry on DFW lists 20d, d'. To determine the oldest entry from the lists 20d, d' to demote, the storage controller 8 may use the logic at blocks 50 et seq. in FIG. 3 to determine whether the sequence numbers "wrapped" when selecting the oldest entry from the lists 20d, d'. The storage controller 8 would then overlay the data to update on the data entry destaged in NVS 14. In this way, the demoted entry is destaged from NVS 14 and is no longer modified data. In such case, the demoted data may be maintained in cache 12 and remain on the sequential 20a or non-sequential 20b lists. If the addition of the data update to NVS 14 will not exceed a limit, then control transfers to block 96 to add the update to NVS 14.

Figure 4B:
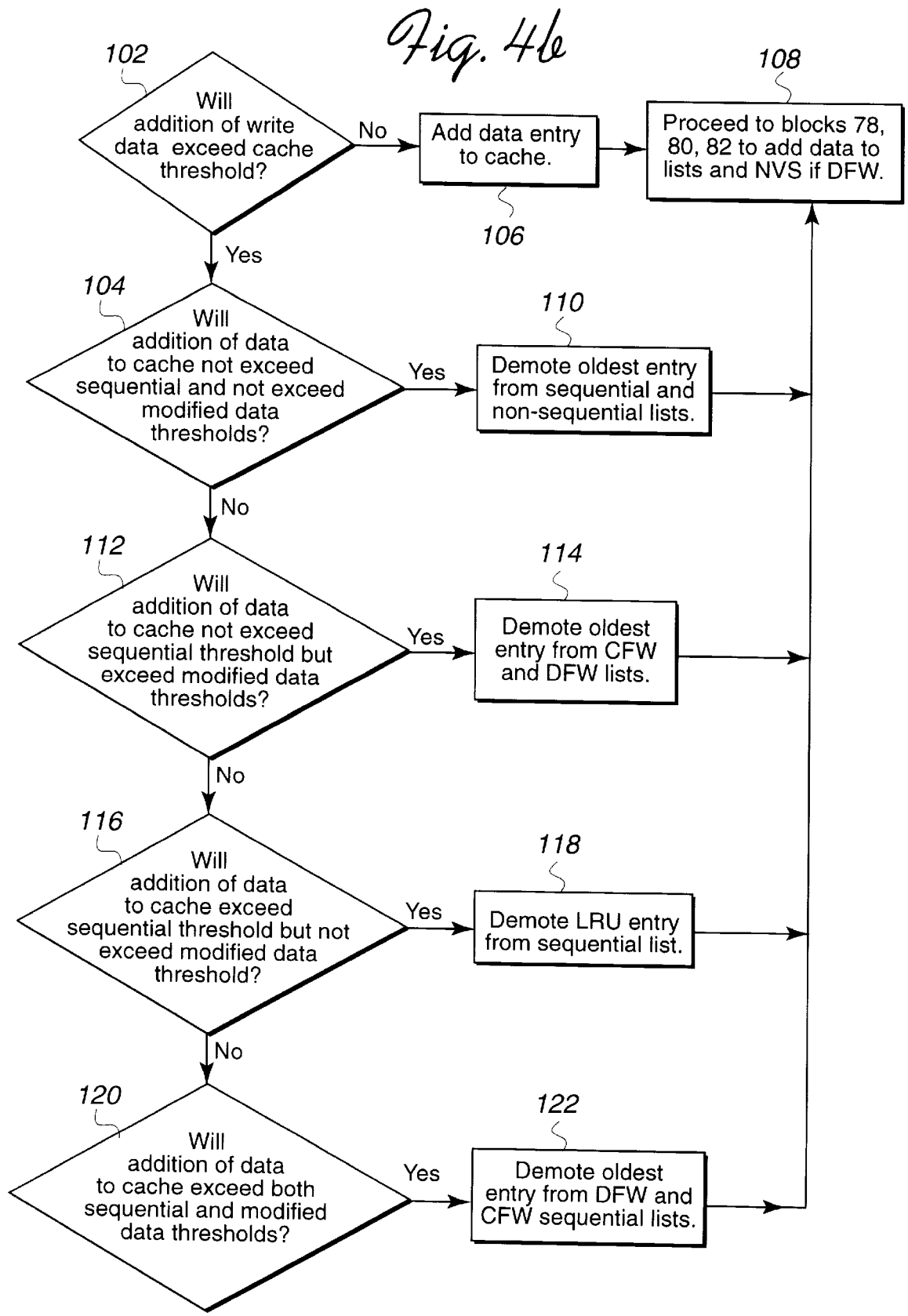

If the data in DASD 6 to be updated is not in cache 12, then control transfers to block 102 in FIG. 4b which represents the storage controller 8 determining whether the addition of the modified data to the cache 12 would exceed a predetermined cache 12 capacity threshold. If so, control transfers to block 104; otherwise, control transfers to block 106 which represents the storage controller 8 adding the modified data to cache and then proceeding to block 108 where the storage controller executes blocks 78, 80, and 82 in parallel to modify the appropriate lists 20a, b, c, c', d, d' to reflect the data added to cache, and to the NVS 14 if the data is a DFW. If data needs to be demoted from cache 12 to make room for the new write data, then at block 104 the storage controller 8 determines whether the addition of the modified data to cache 12 will cause a sequential and modified data thresholds to be exceeded.

The sequential threshold is exceeded when the number of sequentially accessed data entries in cache exceed a predetermined threshold. The current number of sequential entries in cache can be determined by examining the sequential list 20a. The modified data threshold is exceeded when the number of modified data entries exceeds a predetermined threshold. The current number of modified data entries in cache 12 can be determined by examining the total number of entries in the CFW 20c, c' and DFW 20d, d' lists. If the addition of the modified data to cache will not exceed both the sequential and modified thresholds, then control transfers to block 110; otherwise control transfers to block 112. Block 110 represents the storage controller 8 demoting the oldest data entry at the LRU ends 26a, b of the sequential 20a and non-sequential 20b lists. The storage controller 8 may apply the logic of blocks 50 et seq. in FIG. 3 to select the oldest entry in the event there is a wrap. After demoting the oldest entry in cache 12, then control transfers to block 108 to update the lists 20a, b, c, c', d, d' by concurrently executing blocks 78, 80, and 82.

If the addition of data to cache 12 exceeds either sequential or modified thresholds or both, then at block 112, the storage controller 8 determines whether the addition of the modified data entry to cache 12 will not exceed the sequential threshold, but exceed the modified threshold. If so, control transfers to block 114; otherwise, control transfers to block 116. At block 114, the storage controller 8 demotes the oldest entry from the CFW 20*c*, *c*' and DFW 20*d*, *d*' lists. This ensures that a modified data entry is demoted so the addition of the new modified entry does not cause the modified data threshold to be exceeded or further exceeded. The storage controller 8 may apply the logic at blocks 50 et seq. in FIG. 3. To select the two LRU entries from the lists 20*c*, *c*', *d*, *d*' to compare according to the logic at blocks 50 et seq., the storage controller 8 may select the oldest (lowest sequence number) and most recent (highest sequence number) of the LRU entries 26*c*, *c*', *d*, *d*' to compare. From block 114, control transfers to block 108 to update the appropriate lists to reflect the new modified data added to the cache 12. At block 116, the storage controller determines whether the addition of the new modified data to cache 12 will cause the sequential threshold to be exceeded, but not the modified threshold to be exceeded. If so, control transfers to block 118 which represents the storage controller 8 demoting the LRU entry 26*a* from the sequential 20*a* list to not increase the current number of sequentially accessed entries in cache 12.

Block 120 represents the storage controller determining whether the addition of the modified data to cache will cause both the sequential and modified thresholds to be exceeded. If so, control transfers to block 122 to demote the oldest LRU entry 26*c*, *d* from the CFW 20*c* and DFW 20*d* sequential lists using the logic at block 50 et seq. in FIG. 3. The operation at block 122 insures that modified sequential data is demoted from cache 12. The storage controller 8 would also modify one or more of the lists 20*a*, *b*, *c*, *c*', *d*, *d*' to reflect the removal of the demoted data entry. In this way the modified 20*a*, *b*, *c*, *c*', *d*, *d*' lists are used to ensure that data is demoted in a manner that will not exceed certain thresholds of data types in the cache 12, such as sequentially accessed data and modified data.

In further embodiments, the storage controller 8 may adjust the sequence number of sequentially accessed data downward before placing sequentially accessed data on the sequential lists 20*a*, *c*, *d*, thereby accelerating the advancement of sequentially accessed data as a candidate for removal from the cache 12. An example of an accelerated sequence number for sequentially accessed data could be calculated from equation (1) as follows:

$$\text{accelerated sequence number} = \text{MRU sequence count} - \tfrac{1}{2} * (\text{LRU list member count}) \quad (1)$$

Thus, the accelerated sequence number reduces the current MRU sequence number by one-half the number of data entries in the list to which the data entry will be added. Those skilled in the art will appreciate that alternative equations and methods could be used to adjust the sequence number for sequentially accessed data to make such data a more likely candidate for demotion than non-sequentially accessed data.

The time sequence list 20*e* in FIG. 2*b* includes data entries, i.e., pointers to data in cache 12, and a sequence number indicating when the data entry was first modified in cache 12. Thus, data may have been added to cache as part of a read request, but will not be added to the time sequence list 20*e* until such data has been modified in cache 12. The time sequence list may be a user specified subset of tracks in cache 12 or all modified data in cache 12 as indicated in the CFW 20*c*, *c*' and DFW 20*d*, *d*' lists. If the data entry is subsequently modified again, then the sequence number on the time sequence list 20*e* remains unchanged even though it may change on the CFW 20*c*, *c*' or DFW 20*d*, *d*' list. The storage controller 8 further maintains a base sequence number indicating a previous time stamp. In preferred embodiments, the storage controller 8 may destage all data entries from the time sequence list 20*e* having a sequence number that is older than the base sequence number.

When modified data is added to the cache 12 or when a current data entry is updated for the first time, then the storage controller 8 would add the new modified data entry to the time sequence list 20*e* and indicate the sequence number when the modified data was first added. This step of adding a new modified entry to the time sequence list 20*e* may occur concurrently with the other parallel operations 78, 80, and 82 in FIG. 4*a* at the first instance the data is modified in cache. Subsequent modifications of the data entry will not change the entries in the time sequence list 20*e*.

Figure 5:
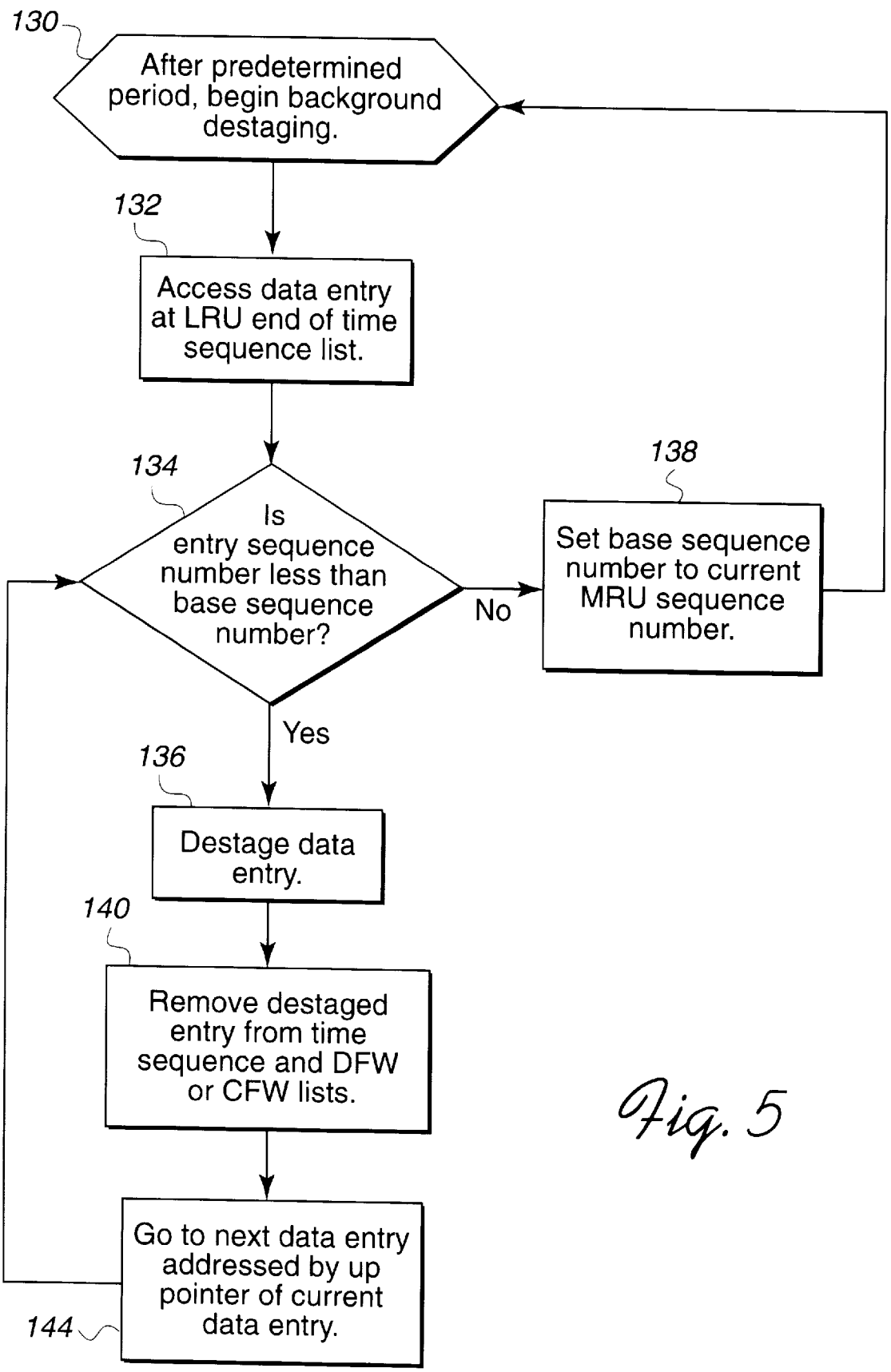
FIG. 5 illustrates logic to destage data from the NVS unit in accordance with preferred embodiments of the present invention.

FIG. 5 illustrates logic executed by the storage controller 8 to periodically destage data from the cache 12 and/or NVS 14 using the time sequence list 20*e*. When the storage controller 8 initiates background destaging, the storage controller 8 sets a base sequence number to the current MRU sequence number. After a predetermined period interval, the storage controller 8 again initiates the background destaging routine using the base sequence number set during the execution of the previous background destaging operation to determine if any data entries in the time sequence list 20*e* have sequence numbers (indicating the time the data was first modified) less than the base sequence number. Such a situation may indicate that although the data entry was placed on the list a while ago, the data entry has, nonetheless, not been destaged. The logic of FIG. 5 ensures that frequently updated data, which has its MRU sequence number frequently reset to the current time value, gets destaged to DASD 6. When a time sequence number is less than the base sequence number, then the modified data was likely updated and, in such case, may not be demoted using the other lists 20*a*, *b*, *c*, *c*', *d*, *d*'. With the logic of FIGS. 3 and 4*a*, *b*, such frequently updated (modified) data would not otherwise be destaged because the sequence number of the modified data in the lists 20*a*, *b*, *c*, *c*', *d*, *d*' is reset each time the data is accessed and placed back at the MRU end 24*a*, *b*, *c*, *c*', *d*, *d*' of the lists 20*a*, *b*, *c*, *c*', *d*, *d*' according to the logic of FIGS. 3, 4*a*, *b*.

With reference to FIG. 5, control begins at block 130 which represents the storage controller 8 periodically initiating a background destaging operation at predetermined time intervals. Control transfers to block 132 which represents the storage controller 8 accessing the data entry at the LRU end 26*e* of the time sequence list 20*e*. Control then transfers to block 134 which represents the storage controller 8 determining whether the sequence number of the accessed data entry in the list 20*e* is less than the base sequence number, i.e., whether the data entry sequence number is older than the base sequence number. If so, control transfers to block 136 which represents the storage controller 8 destaging the accessed data entry. To destage the modified data, the copy of the modified data in the cache 12 or NVS unit 14 is destaged to the DASD 6. Control transfers to block 140 which represents the storage controller 8 removing the destaged data from the CFW 20*c*, *c*' or DFW 20*d*, *d*' lists and the time sequence list 20*e*. However, the destaged data may still remain in cache 12 and on the sequential 20*a* and non-sequential 20*b* lists as unmodified data. Control then transfers to block 144 which represents the storage controller 8 accessing the next data entry in the list closer to the MRU end 24*e* addressed by the up pointer of the current, just considered, data entry. From block 144 control proceeds back to block 134 to process further entries on the list 20*e*.

If the data entry sequence number is not less than the base sequence number, then control transfers to block 138 which represents the storage controller 8 setting the base sequence number to the current MRU sequence number and then back to block 130 to initiate the background destaging operation after a predetermined interval. If the accessed data entry sequence number is greater than the base sequence number, then the data entry is more recent than the base sequence number. As the list is scanned from the LRU end 26e to the MRU end 24e, no further data entries in the time sequence list 20e need be destaged. Once the considered data entry in list 20e has a more recent time value than the base sequence number, no further entries closer to the MRU end 24e would have a time value later than the base sequence number.

Alternative Embodiments and Conclusion

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described with respect to the IBM mainframe environment, where a storage controller unit interfaces numerous host systems with a DASD. However, those skilled in the art will appreciate that the preferred caching algorithms could apply to any data transfer interface known in the art, including SCSI, ST-506/ST-412, IDE/ATA, Enhanced Small Device Interface (ESDI), floppy disk, parallel port, ATA, EIDE, ATA-2, Fast ATA, Ultra ATA, etc., where data is cached.

Preferred embodiments were described with respect to a sequence number used to determine the length of time data has remained unaccessed in the cache. In alternative embodiments, different methods may be used to maintain time information for data entries in the cache, such as a time stamp.

The logic of FIGS. 3–5 may be implemented in microcode accessible to the storage controller 8 or as part of an application the storage controller 8 executes. Still further, the logic of FIGS. 3–5 may be executed in hardwired circuitry dedicated to managing the cache 12. Alternatively, certain of the logic of FIGS. 3–5 may be performed by the host system 4a, b, c. The logic of FIGS. 3–5 is for illustrative purposes. Certain steps may be modified or removed altogether and other steps added. Further, the order of the steps performed may also vary from the described embodiments.

In preferred embodiments, the data maintained in cache may be any data set or format, including fixed block CKD track, record, stripe, etc. Moreover, preferred embodiments were described as removing and adding data to cache 12 in response to DARs. In alternative embodiments, the logic managing the cache may add and remove data as part of data management operations unrelated to specific DARs.

Preferred embodiments were described using seven lists 20a, b, c, c', d, d', e together to manage cache. However, in alternative embodiments, the lists may be used separately and independently of each other. For instance, only the sequential 20a and non-sequential 20b lists may be used to prevent sequentially accessed data from dominating cache;

only the CFW 20c, c' or DFW 20d, d' lists may be used to destage data; and only the time sequence list 20e may be used to insure that modified data is destaged as of a particular time. In yet further embodiments, there may be different lists, such as a single DFW or CFW list of all DFW or CFW entries, both sequential and non-sequential.

In preferred embodiments, the lists were described as implemented as doubly linked list data structures comprised of lists or control blocks. Those skilled in the art will appreciate that alternative data structures may be utilized to implement the lists.

Preferred embodiments were described with respect to managing a cache that buffers data from a DASD. The logic of the preferred embodiments could be used to manage cache that buffers data from any type of memory device, non-volatile as well as volatile, to another cache memory, which may be of a higher speed providing faster access. For instance, data from a DRAM or RAM can be buffered in a higher speed cache, such as a cache that is on-board a microprocessor, e.g., the L2 cache used with the PENTIUM® II microprocessor. PENTIUM II is a registered trademark of Intel Corporation.

In summary, preferred embodiments disclose a cache management scheme using multiple data structures. A first and second data structures indicate data entries in a cache. Each data structure has a most recently used (MRU) entry, a least recently used (LRU) entry, and a time value associated with each data entry indicating a time the data entry was indicated as added to the MRU entry of the data structure. A processing unit receives a new data entry. In response, the processing unit processes the first and second data structures to determine a LRU data entry in each data structure and selects from the determined LRU data entries the LRU data entry that is the least recently used. The processing unit then demotes the selected LRU data entry from the cache and data structure including the selected data entry. The processing unit adds the new data entry to the cache and indicates the new data entry as located at the MRU end of one of the first and second data structures.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for caching data, comprising the steps of:
   providing a first and second data structures indicating data entries in a cache, wherein each data structure has a most recently used (MRU) entry, a least recently used (LRU) entry, and a time value associated with each data entry indicating a time the data entry was indicated as added to the MRU entry of the data structure;
   receiving a new data entry;
   processing the first and second data structures to determine a LRU data entry in each data structure;
   selecting from the determined LRU data entries the LRU data entry that is the least recently used;
   demoting the selected LRU data entry from the cache and data structure including the selected data entry;

adding the new data entry to the cache; and indicating the new data entry as located at the MRU entry of one of the first and second data structures.

2. The method of claim 1, wherein the first data structure indicates data entries in the cache sequentially accessed and the second data structure indicates data entries in the cache non-sequentially accessed, wherein the step of selecting the LRU data entries comprises the steps of:

determining whether adding the new data entry to cache would cause the number of sequentially accessed data entries to exceed a threshold, wherein the step of selecting from the determined LRU data entries the LRU data entry that is least recently used occurs after determining that adding the new data entry to cache would not cause the sequentially accessed data entries to exceed the threshold; and selecting the LRU data entry from the first data structure to demote after determining that adding the new data entry to cache would cause the sequentially accessed data entries to exceed the threshold.

3. The method of claim 2, further comprising the steps of:

receiving a data access request for requested data in the cache;

returning the requested data from the cache;

determining whether the data access request is a sequential access;

indicating that the requested data is located at the MRU entry of the first data structure after determining that the data access request is a sequential access; and indicating that the requested data is located at the MRU entry of the second data structure after determining that the data access request is a non-sequential access.

4. The method of claim 1, wherein the first data structure indicates data entries written to the cache as part of a first type of write operation and the second data structure indicates data entries written to the cache as part of a second type of write operation, wherein data written to the cache as part of the first type of write operation is also written to a first storage unit, and wherein the new data entry comprises data to write to a second storage unit, further comprising the steps of:

determining whether the new data entry is of the first write operation type;

selecting the LRU data entry from the first data structure to destage from the first storage unit to the second storage unit after determining that the new data entry is of the first write operation type;

indicating the selected LRU data entry as removed from the first data structure; and adding the new data entry to the first storage unit, wherein the step of indicating the new data entry as located at the MRU entry of one of the first and second data structures comprises indicating the new data entry as located at the MRU entry of the first data structure.

5. The method of claim 4, further comprising the steps of:

receiving modified data for a data entry that is already in cache;

determining whether the received modified data is of the first type of write operation;

updating the data entry in cache with the received modified data;

updating the data entry in the first storage unit with the received modified data after determining that the received modified data is of the first type of write operation;

indicating that the updated data entry is at the MRU entry of the first data structure after determining that the modified data is of the first type of write operation; and indicating that the updated data entry is at the MRU entry of the second data structure after determining that the data access request is of the second type of write operation.

6. The method of claim 4, further comprising the steps of:

providing a third data structure indicating data entries in cache sequentially accessed and a fourth data structure indicating data entries in cache non-sequentially accessed, wherein the third and fourth data structures have an MRU entry and an LRU entry;

determining whether the new data entry is sequentially accessed data;

indicating that the new data entry is at the MRU entry of the third data structure after determining that the new data entry is sequentially accessed; and indicating that the new data entry is at the MRU entry of the fourth data structure after determining that the new data entry is non-sequentially accessed.

7. The method of claim 1, further comprising a third and fourth data structures, wherein the first data structure indicates modified data entries written in cache and a storage unit as part of a sequential write operation, wherein the second data structure indicates modified data entries written in cache and the storage unit as part of a non-sequential write operation, wherein the third data structure indicates modified data entries written in cache and not the storage unit as part of a sequential write operation, and wherein the fourth data structure indicates modified data entries written in cache and not in the storage unit as part of a non-sequential write operation, wherein the step of processing the first and second data structures further comprises processing the third and fourth data structures to determine an LRU data entry from the first, second, third, and fourth data structures.

8. The method of claim 7, further comprising the step of providing a modified data threshold indicating a maximum number of modified data entries to maintain in cache, wherein the step of processing the four data structures occurs after determining that the addition of modified data to the cache will cause the modified data threshold to be exceeded.

9. The method of claim 8, further comprising a fifth data structure indicating the number of entries in the cache sequentially accessed and a sixth data structure indicating the number of entries in cache non-sequentially accessed, further comprising the steps of:

providing a sequentially accessed threshold indicating a maximum number of sequentially accessed data entries to maintain in cache;

determining whether the addition of a data entry to the cache will cause the number of data entries in cache to exceed the modified and sequentially accessed thresholds, wherein the step of processing the first, second, third, and fourth data structures occurs after determining that the addition of modified data to the cache will exceed the modified data threshold and not exceed the sequentially accessed threshold;

processing the fifth and sixth data structures to determine LRU data entries after determining that the modified threshold is not exceeded, wherein the steps of selecting and demoting comprises selecting and demoting the LRU data entry that is the least recently used entry from the fifth and sixth data structures; and processing the first and third data structures to determine LRU data entries after determining that the modified and sequentially accessed thresholds are both exceeded, wherein the steps of selecting and demoting comprises selecting and demoting the LRU data entry that is the least recently used entry from the first and third data structures.

10. The method of claim 1, wherein the time value cannot exceed a maximum time value, wherein after reaching the maximum time value the time value resets to zero, further comprising the step of determining whether the time value for at least one of the LRU data entries was reset to zero, wherein the step of selecting the LRU data entry comprises selecting the LRU data entry that has a time value that was previously reset.

11. The method of claim 10, wherein the time value comprises a sequence number that is incremented when data entries are indicated as added to the MRU entry of the data structures, wherein the maximum time value comprises a maximum sequence number, and wherein the LRU data entry in a data structure has the lowest sequence number in the data structure, wherein the step of determining whether the time value for an LRU data entry was reset to zero comprises the steps of:
   (i) determining a difference between the sequence numbers of the LRU data entries in the first and second data structures; and
   (ii) determining whether the difference between the sequence numbers is greater than half the maximum sequence number; and
wherein the step of selecting the LRU data entry from the data structures comprises the steps of:
   (i) selecting the LRU data entry having a largest sequence number after determining that the difference between the LRU data entries is greater than half the maximum sequence number; and
   (ii) selecting the LRU data entry having a lowest sequence number after determining that the difference between the LRU data entries is less than half the maximum sequence number.

12. The method of claim 1, further comprising a third data structure indicating data entries in the first and second data structures, wherein each data entry indicated in the third data structure has a modified time value indicating when the data entry was first modified in cache, further comprising the steps of:
   executing a routine at predetermined intervals to destage data from cache to a storage unit;
   providing a base time value indicating a previous time value;
   determining, when executing the routine, data entries in the third data structure having a time value that is older than the base time value;
   destaging, for each determined data entry in the third data structure, the copy of the modified data maintained in cache to the storage unit; and
   indicating the destaged data entry as removed from the third linked list.

13. A system for caching data, comprising:
   a processing unit;
   a cache including data entries;
   a memory area including first and second data structures accessible to the processing unit, wherein the data structures indicate data entries in the cache, wherein each data structure has a most recently used (MRU) entry, a least recently used (LRU) entry, and a time value associated with each data entry indicating a time the data entry was indicated as added to the MRU entry of the data structure;
   program logic executed by the processing unit, comprising:
      (i) means for processing the first and second data structures to determine a LRU data entry in each data structure;
      (ii) means for selecting from the determined LRU data entries the LRU data entry that is the least recently used;
      (iii) means for demoting the selected LRU data entry from the cache and data structure including the selected data entry;
      (iv) means for adding a new data entry to the cache; and
      (v) means for indicating the new data entry as located at the MRU entry of one of the first and second data structure.

14. The system of claim 13, wherein the data structures are linked lists, wherein the MRU entry is at one end of the linked list and the LRU entry is at another end of the linked list.

15. The system of claim 13, wherein the cache and memory area are included in a first memory device, further comprising a second memory device, wherein the cache stores data accessed from the secondary memory device.

16. The system of claim 13, wherein the first data structure indicates data entries in the cache sequentially accessed and the second data structure indicates data entries in the cache non-sequentially accessed, wherein the program logic further comprises:
   means for determining whether adding the new data entry to cache would cause the number of sequentially accessed data entries to exceed a threshold; and
   means for selecting the LRU data entry from the first data structure to demote after determining that adding the new data entry to cache would cause the sequentially accessed data entries to exceed the threshold.

17. The system of claim 16, wherein the program logic further comprises:
   means for receiving a data access request for requested data in the cache;
   means for returning the requested data from the cache;
   means for determining whether the data access request is a sequential access;
   means for indicating that the requested data is located at the MRU entry of the first data structure after determining that the data access request is a sequential access; and
   means for indicating that the requested data is located at the MRU entry of the second data structure after determining that the data access request is a non-sequential access.

18. The system of claim 13, wherein the first data structure indicates data entries written to the cache as part of a first type of write operation and the second data structure indicates data entries written to the cache as part of a second type of write operation, further comprising:
   a first storage unit, wherein data written to the cache as part of the first type of write operation is also written to a first storage unit;
   a second storage unit;
   wherein the program logic further comprises:
      (i) means for determining whether the new data entry is part of the first write operation;
      (ii) means for selecting the LRU data entry from the first data structure to destage from the first storage unit to the second storage unit after determining that the new data entry is part of the first write operation; and (iii) means for adding the new data entry to the first storage unit, wherein the step of indicating the new data entry as located at the MRU entry of one of the first and second data structure comprises indicating the new data entry as located at the MRU entry of the first data structure.

19. The system of claim 18, wherein the program logic further comprises:

means for processing modified data for a data entry that is already in cache;

means for determining whether the modified data is one of the first type of write operation;

means for updating the data entry in cache with the received modified data;

means for updating the data entry in the first storage unit with the received modified data after determining that the received modified data is of the first type of write operation;

means for indicating that the updated data entry is at the MRU entry of the first data structure after determining that the modified data is of the first type of write operation; and means for indicating that the updated data entry is at the MRU entry of the second data structure after determining that the data access request is of the second type of write operation.

20. The system of claim 13, wherein the memory area further comprises a third data structure indicating data entries in the first and second data structures, wherein each data entry in the third data structure has a modified time value indicating when the data entry was first modified in cache, wherein the program logic further comprises:

means for executing a routine at predetermined intervals to destage data from cache to a storage unit;

means for providing a base time value indicating a previous time value;

means for determining, when executing the routine, data entries in the third data structure having a time value that is older than the base time value; and means for destaging, for each determined data entry in the third data structure, the copy of the modified data maintained in cache to the storage unit; and means for indicating the destaged data entry as removed from the third data structure.

21. An article of manufacture for use in programming a processing unit to manage cache, the article of manufacture comprising at least one computer readable storage device including at least one computer program embedded therein that causes the processing unit to perform the steps:

providing a first and second data structures indicating data entries in a cache, wherein each data structure has a most recently used (MRU) entry, a least recently used (LRU) entry, and a time value associated with each data entry indicating a time the data entry was indicated as added to the MRU entry of the data structure;

receiving a new data entry;

processing the first and second data structures to determine a LRU data entry in each data structure;

selecting from the determined LRU data entries the LRU data entry that is the least recently used;

demoting the selected LRU data entry from the cache and data structure including the selected data entry;

adding the new data entry to the cache; and indicating the new data entry as located at the MRU entry of one of the first and second data structures.

22. The article of manufacture of claim 21, wherein the first data structure indicates data entries in cache sequentially accessed and the second data structure indicates data entries in cache non-sequentially accessed, wherein the step of selecting the LRU data entries comprises causing the processing unit to perform the steps of:

determining whether adding the new data entry to cache would cause the number of sequentially accessed data entries to exceed a threshold, wherein the step of selecting from the determined LRU data entries the LRU data entry that is least recently used occurs after determining that adding the new data entry to cache would not cause the sequentially accessed data entries to exceed the threshold; and selecting the LRU data entry from the first data structure to demote after determining that adding the new data entry to cache would cause the sequentially accessed data entries to exceed the threshold.

23. The article of manufacture of claim 22, further comprising the steps of:

receiving a data access request for requested data in the cache;

returning the requested data from the cache;

determining whether the data access request is a sequential access;

indicating that the requested data is located at the MRU entry of the first data structure after determining that the data access request is a sequential access; and indicating that the requested data is located at the MRU entry of the second data structure after determining that the data access request is a non-sequential access.

24. The article of manufacture of claim 21, wherein the first data structure comprises data entries written to the cache as part of a first type of write operation and the second data structure comprises data entries written as part of a second type of write operation, wherein data written to the cache as part of the first type of write operation is also written to a first storage unit, and wherein the new data entry comprises data to write to a second storage unit, further comprising the steps of:

determining whether the new data entry is of the first write operation type;

selecting the LRU data entry from the first data structure to destage from the first storage unit to the second storage unit after determining that the new data entry is of the first type of write operation type;

indicating the selected LRU data entry as removed from the first data structure; and adding the new data entry to the first storage unit, wherein the step of indicating the new data entry as located at the MRU entry of one of the first and second data structures comprises indicating the new data entry as located at the MRU entry of the first data structure.

25. The article of manufacture of claim 24, further comprising the steps of:

receiving modified data for a data entry that is already in cache;

determining whether the received modified data is of the first type of write operation;

updating the data entry in cache with the received modified data;

updating the data entry in the first storage unit with the received modified data after determining that the received modified data is of the first type of write operation;

indicating that the updated data entry is at the MRU entry of the first data structure after determining that the modified data is of the first type of write operation; and indicating that the updated data entry is at the MRU entry of the second data structure after determining that the modified data is of the second type of write operation.

26. The article of manufacture of claim 25, further comprising the steps of:

providing a third data structure indicating data entries in cache sequentially accessed and a fourth data structure of data entries in cache non-sequentially accessed, wherein the third and fourth data structures have an MRU entry and an LRU entry;

determining whether the new data entry is sequentially accessed data;

indicating that the new data entry is at the MRU entry of the third data structure after determining that the new data entry is sequentially accessed; and indicating that the new data entry is at the MRU entry of the fourth data structure after determining that the new data entry is non-sequentially accessed.

27. The article of manufacture of claim 21, further comprising a third and fourth data structures, wherein the first data structure indicates modified data entries written in cache and a storage unit as part of a sequential write operation, wherein the second data structure indicates modified data entries written in cache and the storage unit as part of a non-sequential write operation, wherein the third data structure indicates modified data entries written in cache and not the storage unit as part of a sequential write operation, and wherein the fourth data structure indicates modified data entries written in cache and not in the storage unit as part of a non-sequential write operation, wherein the step of processing the first and second data structures further comprises processing the third and fourth data structures to determine an LRU data entry from the first, second, third, and fourth data structures.

28. The article of manufacture of claim 27, further comprising the step of providing a modified data threshold indicating a maximum number of modified data entries to maintain in cache, wherein the step of processing the four data structures occurs after determining that the addition of modified data to the cache will cause the modified data threshold to be exceeded.

29. The article of manufacture of claim 28, further comprising a fifth data structure indicating the number of entries in the cache sequentially accessed and a sixth data structure indicating the number of entries in cache non-sequentially accessed, further comprising the steps of:

providing a sequentially accessed threshold indicating a maximum number of sequentially accessed data entries to maintain in cache;

determining whether the addition of a data entry to the cache will cause the number of data entries in cache to exceed the modified and sequentially accessed thresholds, wherein the step of processing the first, second, third, and fourth data structures occurs after determining that the addition of modified data to the cache will exceed the modified data threshold and not exceed the sequentially accessed threshold;

processing the fifth and sixth data structures to determine LRU data entries after determining that the modified threshold is not exceeded, wherein the steps of selecting and demoting comprises selecting and demoting the LRU data entry that is the least recently used entry from the fifth and sixth data structures; and processing the first and third data structures to determine LRU data entries after determining that the modified and sequentially accessed thresholds are both exceeded, wherein the steps of selecting and demoting comprises selecting and demoting the LRU data entry that is the least recently used entry from the first and third data structures.

30. The article of manufacture of claim 21, wherein the time value cannot exceed a maximum time value, wherein after reaching the maximum time value the time value resets to zero, further comprising the step of determining whether the time value for at least one of the LRU data entries was reset to zero, wherein the step of selecting the LRU data entry comprises selecting the LRU data entry that has a time value that was previously reset.

31. The article of manufacture of claim 21, wherein the time value comprises a sequence number that is incremented when data entries are indicated as added to the MRU entry of the data structures, wherein the maximum time value comprises a maximum sequence number, and wherein the LRU data entry in a data structure has the lowest sequence number in the data structure, wherein the step of determining whether the time value for an LRU data entry was reset to zero comprises the steps of:

(i) determining a difference between the sequence numbers of the LRU data entries in the first and second data structures; and (ii) determining whether the difference between the sequence numbers is greater than half the maximum sequence number; and wherein the step of selecting the LRU data entry from the data structures comprises the steps of:

(i) selecting the LRU data entry having a largest sequence number after determining that the difference between the LRU data entries is greater than half the maximum sequence number; and (ii) selecting the LRU data entry having a lowest sequence number after determining that the difference between the LRU data entries is less than half the maximum sequence number.

32. The article of manufacture of claim 21, further comprising a third data structure indicating data entries in the first and second data structures, wherein each data entry in the third data structure has a modified time value indicating when the data entry was first modified in cache, further comprising the steps of:

executing a routine at predetermined intervals to destage data from cache to a storage unit;

providing a base time value indicating a previous time value;

determining, when executing the routine, data entries in the third data structure having a time value that is older than the base time value;

destaging, for each determined data entry in the third data structure, the copy of the modified data maintained in cache to the storage unit; and indicating the destaged data entry as removed from the third data structure.

33. A memory area accessible to a processing unit, wherein the memory unit stores:

a plurality of data entries;

a first and second data structures indicating the data entries, wherein each data structure has a most recently used (MRU) entry, a least recently used (LRU) entry, and a time value associated with each data entry indicating a time the data entry was indicated as added to the MRU entry of the data structure; and a new data entry added to the memory area, wherein the processing unit processes the first and second data structures to determine a LRU data entry in each data structure and selecting from the determined LRU data entries the LRU data entry that is the least recently used, wherein the processing unit demotes the selected LRU data entry from the cache and data structure including the selected data entry, and wherein the processing unit indicates that the new data entry as located at the MRU entry of one of the first and second data structures.

34. The memory area of claim 33, wherein the first and second data structures are comprised of linked lists in cache, wherein the MRU entry is at one end of the linked list and the LRU entry is at the other end of the linked list.

35. The memory area of 33, wherein the first data structure indicates data entries in cache sequentially accessed and the second data structure indicates data entries in cache non-sequentially accessed, wherein the processing unit determines whether adding the new data entry to the memory area would cause the number of sequentially accessed data entries to exceed a threshold, and wherein the processing unit selects the LRU data entry from the first data structure to demote after determining that adding the new data entry to cache would cause the sequentially accessed data entries to exceed the threshold.

36. The memory area of claim 35, wherein the processing unit indicates that a data entry to which a data access request was directed is located at the MRU entry of the first data structure after determining that the data access request is a sequential access, and wherein the processing unit indicates that the data entry to which the data access request was directed is located at the MRU entry of the second data structure after determining that the data access request is a non-sequential access.

37. The memory area of claim 33, wherein the first data structure indicates data entries written to the cache as part of a first type of write operation and the second data structure indicates data entries written to the cache as part of a second type of write operation, wherein the processing unit writes data written to the cache as part of the first type of write operation to a first storage unit, wherein the processing unit selects the LRU data entry from the first data structure to destage from the first storage unit to a second storage unit after determining that the new data entry is part of the first write operation, and wherein the processing unit adds the new data entry to the first storage unit, wherein the step of indicating the new data entry as located at the MRU entry of one of the first and second data structures comprises indicating the new data entry as located at the MRU entry of the first data structure.

38. The memory area of claim 33, further comprising a third and fourth data structures, wherein the first data structure indicates modified data entries written in cache and a storage unit as part of a sequential write operation, wherein the second data structure indicates modified data entries written in cache and the storage unit as part of a non-sequential write operation, wherein the third data structure indicates modified data entries written in cache and not the storage unit as part of a sequential write operation, and wherein the fourth data structure indicates modified data entries written in cache and not in the storage unit as part of a non-sequential write operation, wherein the step of processing the first and second data structure s further comprises processing the third and fourth data structures to determine an LRU data entry from the first, second, third, and fourth data structures.

39. The memory area method of claim 33, wherein the memory area further comprises a third data structure indicating data entries in cache sequentially accessed and a fourth data structure indicating data entries in cache non-sequentially accessed, wherein the third and fourth data structures have an MRU entry and an LRU entry, wherein the processing unit indicates that the new data entry is at the MRU entry of the third data structure after determining that the new data entry is sequentially accessed; and indicates that the new data entry is at the MRU entry of the fourth data structure after determining that the new data entry is non-sequentially accessed.

40. The memory area of claim 33, wherein the memory area further comprises:

a third data structure indicating data entries in the first and second data structures, wherein each data entry in the third list has a modified time value indicating when the data entry was first modified in cache; and a base time value indicating a previous time value, wherein the processing determines data entries in the third data structure having a time value that is older than the base time value and, for each determined data entry in the third data structure, destages the copy of the modified data maintained in cache to the storage unit.

* * * * *

UNITED STATES PATENT AND TRADEMARK OFFICE
CERTIFICATE OF CORRECTION

PATENT NO. : 6,141,731
DATED : October 31, 2000
INVENTOR(S) : Brent Cameron Beardsley et al.

It is certified that error appears in the above-identified patent and that said Letters Patent is hereby corrected as shown below:

Column 17,
Line 57, please delete "third linked list" and insert therefore -- third data structure --

Column 24,
Line 21, please delete "structure s" and insert therefore -- structures --

Signed and Sealed this

Fourth Day of January, 2005

JON W. DUDAS
*Director of the United States Patent and Trademark Office*